Feb. 7, 1933.  E. I. McKESSON  1,896,716
GAS HANDLING APPARATUS
Filed Dec. 21, 1926  2 Sheets-Sheet 1
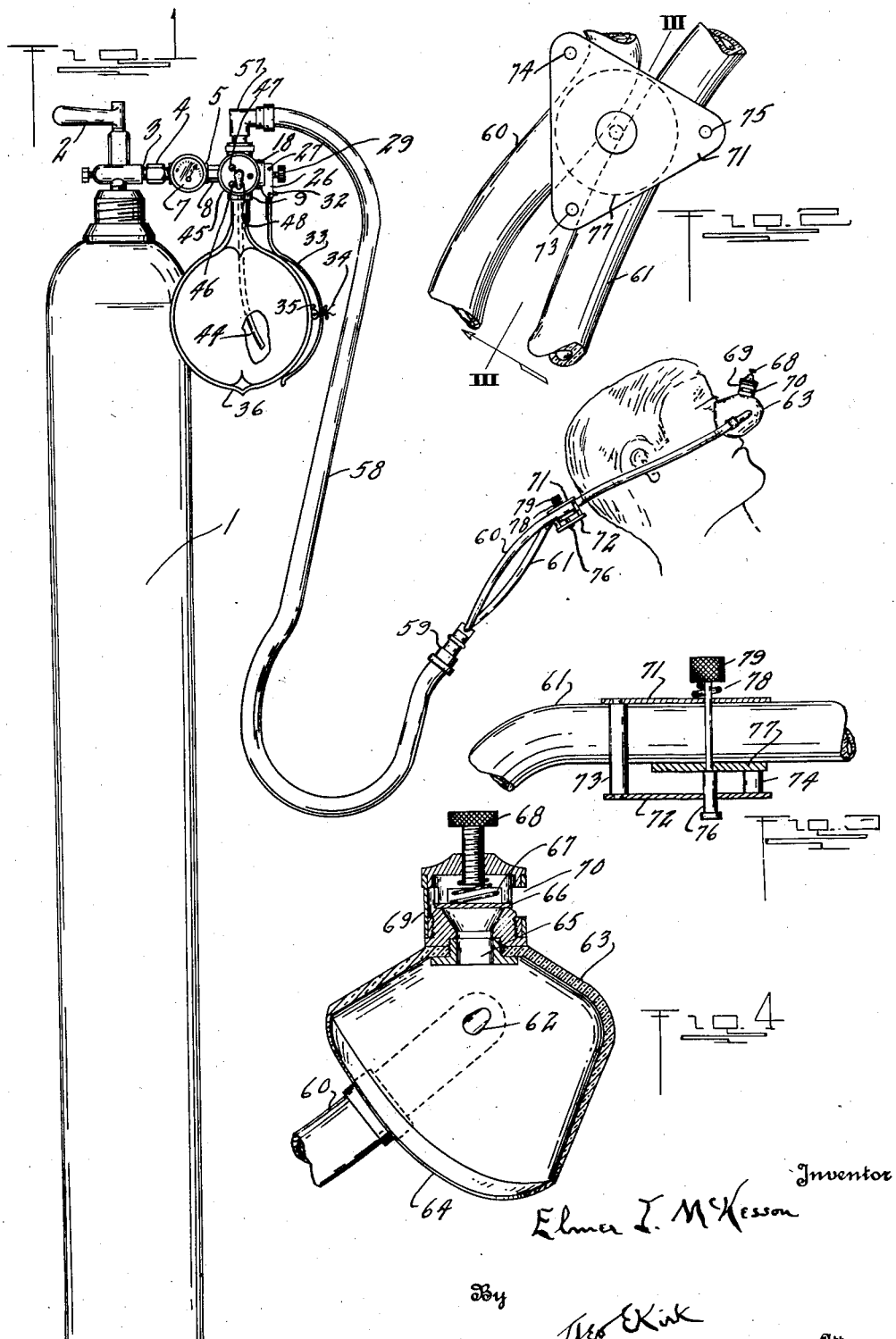

Feb. 7, 1933.  E. I. McKESSON  1,896,716
GAS HANDLING APPARATUS
Filed Dec. 21, 1926   2 Sheets-Sheet 2
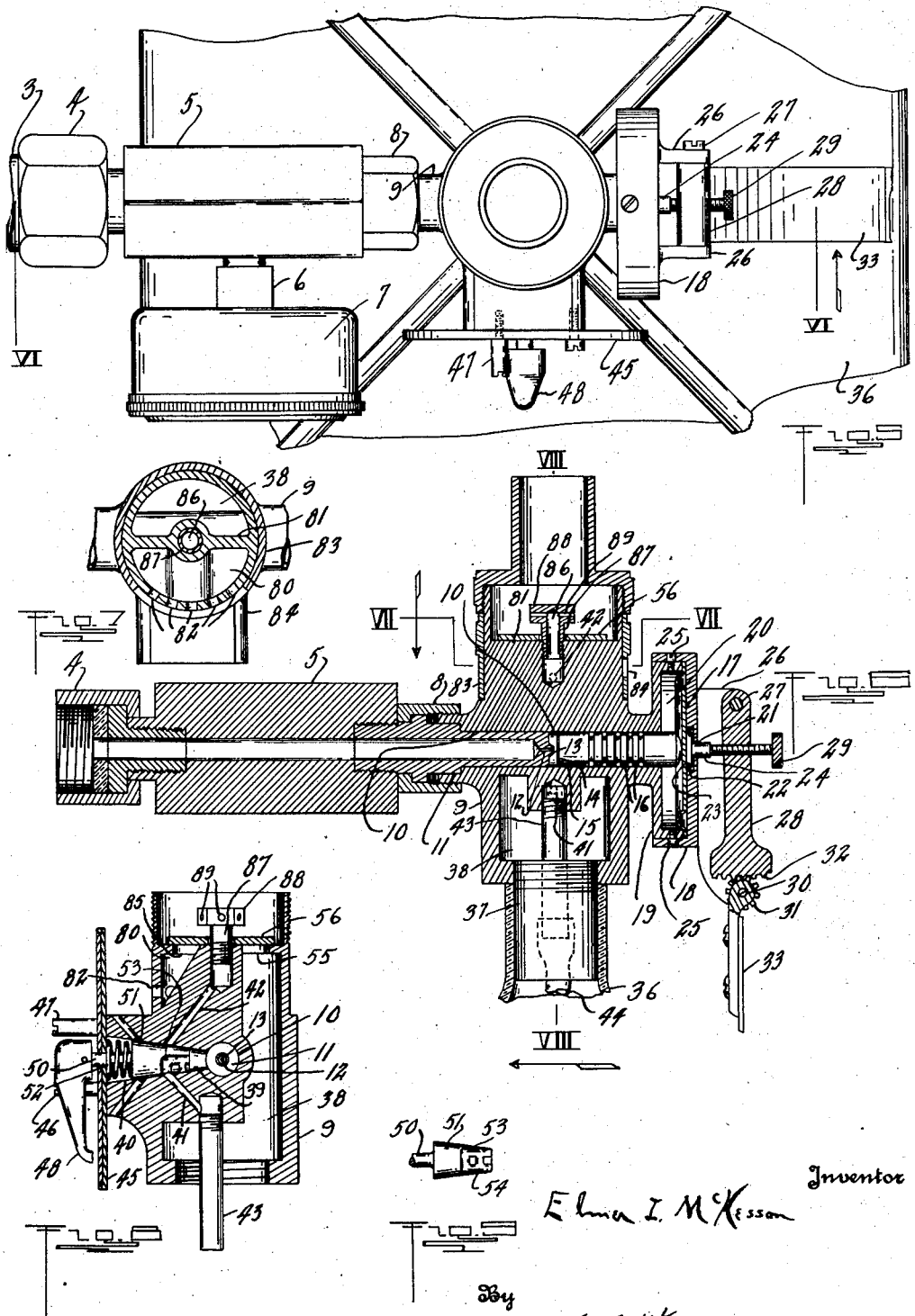

Patented Feb. 7, 1933

1,896,716

UNITED STATES PATENT OFFICE

ELMER I. McKESSON, OF TOLEDO, OHIO

GAS HANDLING APPARATUS

Application filed December 21, 1926. Serial No. 156,212.

This invention relates to delivery of gas as impelled from a relatively high pressure source.

This invention has utility when adapted to the administration of oxygen, especially for resuscitation and favoring respiration as building up vital resistance.

Referring to the drawings:

Fig. 1 is a side elevation, with parts broken away, of an embodiment of the invention as a gas delivery apparatus;

Fig. 2 is a detail view of the delivery duct adjustment for nozzle positioning;

Fig. 3 is a section on the line III—III Fig. 2;

Fig. 4 is a section through the delivery nozzle or mask;

Fig. 5 is a fragmentary plan view of the device of Fig. 1;

Fig. 6 is a section on the line VI—VI Fig. 5 looking in the direction of the arrow;

Fig. 7 is a section on the line VII—VII Fig. 6 looking in the direction of the arrow;

Fig. 8 is a section on the line VIII—VIII Fig. 6; and

Fig. 9 is a detail view of the rotatable valve member for controlling the pressure bypass.

High pressure gas supply tank 1 may be charged with oxygen. Tank valve 2 may be operated for permitting gas flow at high pressure from the tank 1 by externally threaded duct 3. Union 4 is effective for assembling duct extension 5 as a fitting element herein provided with branch 6 carrying pressure gage 7 directly indicating the pressure in the tank 1. This fitting element 5 is connected by union 8 with valve body 9 having directly centrally therethrough transverse duct 10.

Coaxial with the union 8 and as a continuation of the duct of the fitting element 5 is tubular member 11 extending into the duct 10 and terminating in reduced port 12 having terminal seat 13 against which engages fiber washer 14 as the terminus for plunger 15 carrying packing rings 16. This plunger 15 is reciprocable in duct 10 and protrudes therefrom to engage diaphragm 17 mounted by cup member 18 upon housing enlargement portion 19 as forming diaphragm chamber 20.

This cup member 18 has central opening 21 with surrounding seat 22 in which is disposed enlarged head 23 of stem 24. When this head and stem member 23, 24, is thus assembled then this cup member 18 may, by set screws 25, be anchored with the enlargement 19. This member 18 carries a pair of parallel flanges 26, with pivot pin 27 from which depends lever 28 carrying adjustable set screw 29 for abutting the stem 24. This pair of flanges 26, remote from the pivot pin 27, carries an additional pivot pin 30 mounting pinion 31 in mesh with toothed segment terminal 32 of the lever 28. Fixed with this pinion 30 is depending flexible spring arm 33 having cord connection 34 to ear 35 of expansible reservoir or bag 36. This cord connection serves to hold the deflated bag in approximate position so that upon inflation this bag 36, as connected by fitting 37 with chamber 38 of the valve body 9, may, as depending, be thrust by the yieldable arm 33 toward the tank 1.

Adjacent the terminus of the port 12, the duct 10 has lateral port 39 (Fig. 8) to a tapered seat 40 having ways 41, 42, therefrom. The way 41 extends to tube 43 having flexible extension 44 down into the bag 36 as a muffling means against noise from high pressure gas discharge into the bag 36.

About this tapered seat 40 there is disposed indicator plate 45 carrying stops 46, 47, (Figs. 1, 6). Indicator arm 48 is mounted on stem 50 for rotating tapered member 51 yieldably held by spring 52 into seating engagement in the seat 40 toward the port 39 from the duct 10.

With the operating arm or handle 48 against the stop 46, its ways 53, 54, in the member 51 are in position for delivering pressure gas, as oxygen, from the duct 10 for flow by way 41, tubes 43, 44, into the bag 36. Thence such gas rises into chamber 38 and flows by port 55 against check disk 56 to lift such disk and pass from the body 9 by tubular fitting 57 through duct 58, branch fitting 59, minor ducts 60, 61, having port openings 62 (Fig. 4) into mask 63 having flap 64 for seating snugly against the face of the patient.

The mask 63 is herein shown as a nasal mask provided with exhaust port 65 having disk 66 normally held by spring 67 into seating position on the port 65. The compression of this spring 67 is adjusted by set screw 68. There is accordingly provided an adjustable exhaling valve for this mask 63. Sleeve 69 about this exhaling fitting is provided with lateral port 70 so that the exhalations may be directed, say away from one working with the patient.

Plates 71, 72, having posts 73, 74, 75, embrace the pair of branched ducts 60, 61. Additional post 76 centrally through these plates 71, 72, has fast thereon between the plates 71, 72, supplemental plate 77. Compression spring 78 about this post 76 between head 79 and the plate 71 tends normally to hold the supplemental plate 77 toward the plate 71 as a clamp for the pair of branched ducts 60, 61. This plate device may be shifted toward or from the mask 63 and thus limit the extent of the duct portions between this clamp and the mask as a head embracing loop means for positioning the mask upon the patient.

The port 55 from the chamber 38 is isolated from chamber 80 (Fig. 7) by partition 81 in the body 9. This chamber 80 has a plurality of intake ports 82 the extent of opening of which may be determined by rotating sleeve 83 on the body 9 which sleeve has elongated port 84. Accordingly, upon inspiration by the patient at the mask 63 there may be a reduction in the pressure of the gas in the bag 36 due to the drawing of the oxygen therefrom past the check disk 56. The series compound lever device 28, 33, serves to effect automatic replenishment in maintaining the constant pressure in the bag 36, which pressure is very greatly reduced from that in the tank 1. As it may be found desirable in the administration of less than 100% oxygen the sleeve 83 may be rotated to have its port 84 expose such number of the ports 82 as may be desired. This supplemental atmospheric air may enter the chamber 80 under the check disk 56 and at the lifting of such disk 56 by the inhalation of the patient, pass through port 85, thus to flow in common with the oxygen or other supplied gas from the tank 1 for delivery to the patient at the mask 63.

The arm 48 may be shifted from the position against the stop 46 to position against the stop 47 thereby rotating the member 51 to cut off communication between the port 39 and the way 41. This three way valve device with the handle or arm 48 against the stop 47 places the port 39 in communication with the way 42. This way 42 is in the partition 81 and extends to way 86 (Fig. 6) in tubular bolt 87 herein shown as having head 88 as a retaining means for limiting the lifting of the check disk 56 from the ports 55, 85. The way 86 in this tubular bolt 87 is in communication with radiating outlet ports 89 in the bolt head 88 for effecting distribution of the high pressure gas from the tank 1 as now bypassing the bag 36 and connected for flowing directly to the patient at the mask 63 except as checked by the controller device of the system of levers from the bag 36 actuating the plunger 15 to keep the port 12 closed. Depression of the lever 33 against the expansion action of the bag 36 allows a spurt of high pressure gas to flow from the duct 10 and be dispersed by ports 89 thus effecting a seating of the check disk 56 and the pressure flow to the mask 63.

In the operation of this device for high pressure gas delivery directly to the patient advantages arise in using the apparatus in instances of resuscitation or where there is such physical weakness that sustained lung action is efficacious. The operator may depress the lever 33 for the slight interval of inhalation desired or in sequence with inhalation attempted by the patient. At once the patient's lungs have been given a filling with a slight distension as determined by the adjustment for the exhaling disk 66 at the mask 63, the lever 33 is released. In practice this is really only a quick depression and release operation for the arm 33. The mask 63 may be withdrawn from position on the patient's face or the patient, if able, may exert exhalation effort against resistance of the exhaling valve 66. The repetition of this cycle of operations is followed for the desired interval in bringing the patient back to or approaching normal inhalations.

The device of this disclosure is of great value in the administration of pure oxygen. This value has developed in increasing the vital resistance of the patient and has, as so operated in supplementing the available oxygen for the blood stream and parts supplied thereby been helpful in acute articular rheumatism and joint pains. In asthma, it has been helpful in relieving the bronchiola spasms.

In cardiac disease where the patient has had the pulmonary passages clogged with frothy matter, the operation of this machine for dilating the lungs has been effective in so restoring heart action that the patient has been able to throw off the lung accumulation and thereafter get about normal duties. Local gas accumulations which attack seriously the nervous system due to lodgment in different places have been treated with the restoration of normal functioning of the respiratory system as well as relief of the nervous disturbances therefrom.

What is claimed and it is desired to secure by Letters Patent is:

1. A gas supply tank having a valve and a discharge duct, a fitting mounted on the duct and thereby rigidly assembled with the tank with which the gage is rigidly mounted, a control valve having a supply duct from the fitting for flow from the duct, expansible reservoir carried by the fitting and thereby sustained by the tank, and a controller for the control valve carried by the fitting for holding the reservoir against the tank as a rigid assembly unit, and sustaining means for the fitting thereby to mount the gage, valve controller, and reservoir to be carried by said sustaining means at said fitting.

2. A gas delivery apparatus valve body comprising a duct therethrough, a partition in said body from said duct forming ways terminating in a two ported seat, a check disk for acting on said seat, a tubular bolt for limiting disk rise from the seat, said bolt being in communication with one of said ways for bypassing the check disk and thereby holding said check disk seated, said duct being effective through the other way to be in communication with one side of the check disk port and one side of said partition, and a valve for controlling supply under the check disk on the other side of the partition and the other port.

3. A gas delivery apparatus comprising a valve body having a transverse duct centrally therethru, said body having additionally lengthwise thereof and past said duct a passage apart from said duct, a check valve in said passage and therealong away from the duct, an off-take duct from the passage on the side of the check valve away from the transverse duct, an expansion reservoir connected to the passage on the side of the check valve away from the off-take, a supply valve for said reservoir in said transverse duct including an element reciprocable transversely of the passage extent, and a control from the reservoir for said valve element.

4. A gas delivery apparatus comprising a valve body having means adapted for attachment to a tank to be sustained thereby, said body having a transverse duct centrally therethru and in communication with said tank thru said attachment means, said body further having a passage therethru independent of and at an angle to the direction of extent of said duct, an off-take duct one way from said passage, an expansion chamber the other way from said passage, a check valve in said passage between the chamber and off-take duct, a supply valve in said transverse duct for said reservoir, and a control from said reservoir for said supply valve.

5. Gas delivery apparatus comprising a valve body having a transverse duct centrally therethru and an additional independent passage therethru at an angle to the direction of extent of said duct, an off-take duct from the passage, a supply valve in the transverse duct for flow of gas for said passage, means including a pressure control for said supply valve connected to the passage on the side away from the off-take duct, and in said body and in communication with said supply duct an additional valve by-passing said supply valve in providing for gas flow to the off-take duct.

6. Gas delivery apparatus comprising a valve body having a transverse duct centrally therethru and an additional independent passage therethru at an angle to the direction of extent of said duct, an off-take duct from the passage, a delivery pressure controlled supply valve in the transverse duct for flow of gas for said passage, means embodying a pressure control for said supply valve connected to the passage on the side away from the off-take duct, a check valve in the body separating the off-take duct from the controlling delivery pressure for the supply valve, and a by-pass valve in said body for said supply and check valves and between said ducts.

7. Gas delivery apparatus comprising a valve body having therethru a supply duct in one direction and an independent passage in a different direction, an off-take duct from the passage, a pressure operated supply valve and check valve in said body in series with said passage between said ducts, means embodying a pressure control for said supply valve connected to the passage on the side away from the off-take duct, and a controllable intake valve in said body to said check valve independent of said passage coacting upon check valve opening for supply duct gas flow from the passage in parallel with gas flow from the intake valve to the off-take duct.

In witness whereof I affix my signature.
ELMER I. McKESSON.

CERTIFICATE OF CORRECTION.

Patent No. 1,896,716.                                February 7, 1933.

ELMER. I. McKESSON.

It is hereby certified that error appears in the printed specification of the above numbered patent requiring correction as follows: Page 3, line 2, claim 1, beginning with the word "and" strike out all to and including the word "fitting" in line 13, and insert instead "and thereby rigidly assembled with the tank, a control valve for flow from the duct, an expansible reservoir carried by the fitting and thereby sustained by the tank, and a controller for the control valve carried by the fitting for holding the reservoir against the tank, thereby coacting in opposition to the tank for reservoir inflation and deflation response"; and that the Letters Patent should be read with this correction therein that the same may conform to the record of the case in the Patent Office.

Signed and sealed this 9th day of May, A. D. 1933.

(Seal)                                         M. J. Moore,
                                        Acting Commissioner of Patents.